June 4, 1963 J. A. DINSMORE ET AL 3,092,344

STRIP TENSIONING APPARATUS

Filed May 11, 1961 5 Sheets-Sheet 1

JOSEPH A. DINSMORE & RICHARD I. SEDDON
INVENTORS

BY Robert G. Clay

ATTORNEY

JOSEPH A. DINSMORE &
RICHARD I. SEDDON
INVENTORS

BY Robert G. Clay

ATTORNEY

June 4, 1963 J. A. DINSMORE ETAL 3,092,344

STRIP TENSIONING APPARATUS

Filed May 11, 1961 5 Sheets-Sheet 3

JOSEPH A. DINSMORE &
RICHARD I. SEDDON
INVENTORS

BY Robert G. Clay
ATTORNEY

June 4, 1963 J. A DINSMORE ETAL 3,092,344

STRIP TENSIONING APPARATUS

Filed May 11, 1961 5 Sheets-Sheet 4

JOSEPH A. DINSMORE &
RICHARD I. SEDDON
INVENTORS

BY Robert H. Clay
ATTORNEY

JOSEPH A. DINSMORE &
RICHARD I. SEDDON
INVENTORS
BY Robert G. Clay
ATTORNEY

United States Patent Office 3,092,344
Patented June 4, 1963

3,092,344
STRIP TENSIONING APPARATUS

Joseph A. Dinsmore, San Carlos, and Richard I. Seddon, Palo Alto, Calif., assignors to Ampex Corporation, Redwood City, Calif., a corporation of California Filed May 11, 1961, Ser. No. 109,337
13 Claims. (Cl. 242—55.12)

This invention relates to strip transports and particularly to apparatus for maintaining constant tension in the strip material thereof.

In the magnetic tape transport art, many efforts have been made to regulate the tension of the segment of tape at and near the transducing heads so as to preserve a constant length and velocity thereof, whereby the frequency of the recorded signal is the same during playback as it was during recording.

One problem that has been encountered is that the tension of the tape coming off the supply reel tends to increase as the radius of the supply reel pack decreases, resulting in an elongation of the tape segment at the heads and a lowering of the signal frequency. Previous practioners of the art have partly overcome this effect by installing a tape tension sensing arm to control a brake band engaging the supply reel, so as to relieve the holdback torque on the reel whenever the tape tension tends to increase. But the brake bands used have generally been unresponsive to the tiniest changes in tape tension; and the associated apparatus has had a high degree of internal friction, also limiting response ability, so that some changes in tension inevitably slip through.

Accordingly, it is an object of the present invention to provide a tape transport and tensioning apparatus therefor that maintains a segment of tape at and near the transducing heads at precisely constant length, tension and velocity so that the frequency of the input signal is faithfully recorded and reproduced.

It is another object of the invention to provide a tape tensioning apparatus that is sensitively responsive to the minutest potential tape tension variations to automatically correct for and eliminate tendencies to change before they become effective.

It is a further object of the invention to provide a tape tensioning apparatus having substantially zero internal frictional moment to be overcome in response to potential tension changes.

It is a further object of the invention to provide a tape tensioning apparatus including a brake having substantially instantaneous response to the minutest change in braking forces applied thereto.

It is still another object of the invention to provide a tape transport as above described and of the greatest simplicity of structure and parts for economical manufacture and use, and particularly adapted for ease of threading and operation.

These and other objects are attained by the structure of the invention in which a brake band of novel construction is used in a brake to regulate the holdback torque of a supply reel in accordance with a tape tension sensing derived from a sensing arm engaging the tape. The brake band is formed of a plurality of fine strands of wire laid loosely side by side and secured at the ends and covered with a sheath of frictional material so that the band has substantially zero resistance to bending moments and responds with great sensitivity to transmit delicate changes in the forces applied to it and to correspondingly change the braking forces for the reel. The coupling between the sensing arm and the brake band, and associated couplings between the brake band and a band tensioning spring, are arranged to have substantially zero internal friction to be overcome in transmitting changes of tension and braking forces. The combination of these two features in a tensioning apparatus permits an unprecedented and complete control of tape tension, velocity and elongation within that segment of the tape that is passing at any moment over the transducing heads.

Other objects and advantages will be explained in the following specification, considered together with the accompanying drawings, in which.

Figure 1:
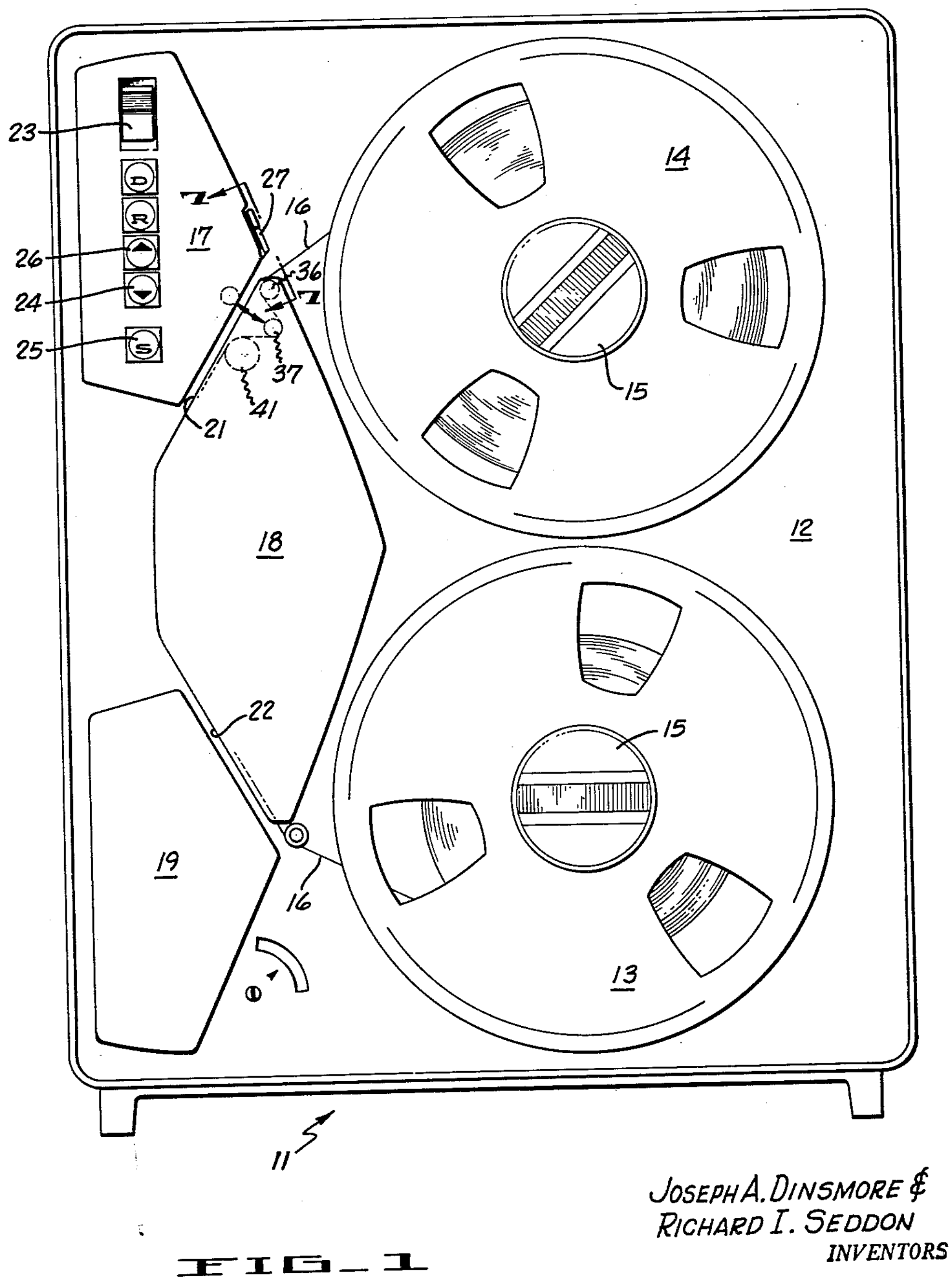
FIGURE 1 is a plan view of a tape transport constructed in accordance with the invention.

Referring now to FIGURE 1, there is shown a tape transport 11 having a top plate 12 above which are mounted a pair of takeup and supply reels 13 and 14 secured to spindles 15, together with a tape 16 stretched therebetween. Below the reels and projecting above the level of the top plate 12 are three raised islands 17, 18 and 19 defining a pair of tape threading channels 21 and 22 for easy threading of the tape 16. The island 17 serves as a mounting panel for a master power switch 23 and a further bank of switches including forward play switch button 24, a stop switch button 25, and a rewind switch button 26. Also shown is a manually engageable and removable finger 27 that projects across the channel 21 in certain conditions of the mechanism to prevent threading of the tape at undesirable times. The island 18 serves as a cover panel for transducing heads 31, 32, 33 and 34, better shown in FIGURE 2. The island 19 is positioned in balanced relation to island 17.

Figure 2:
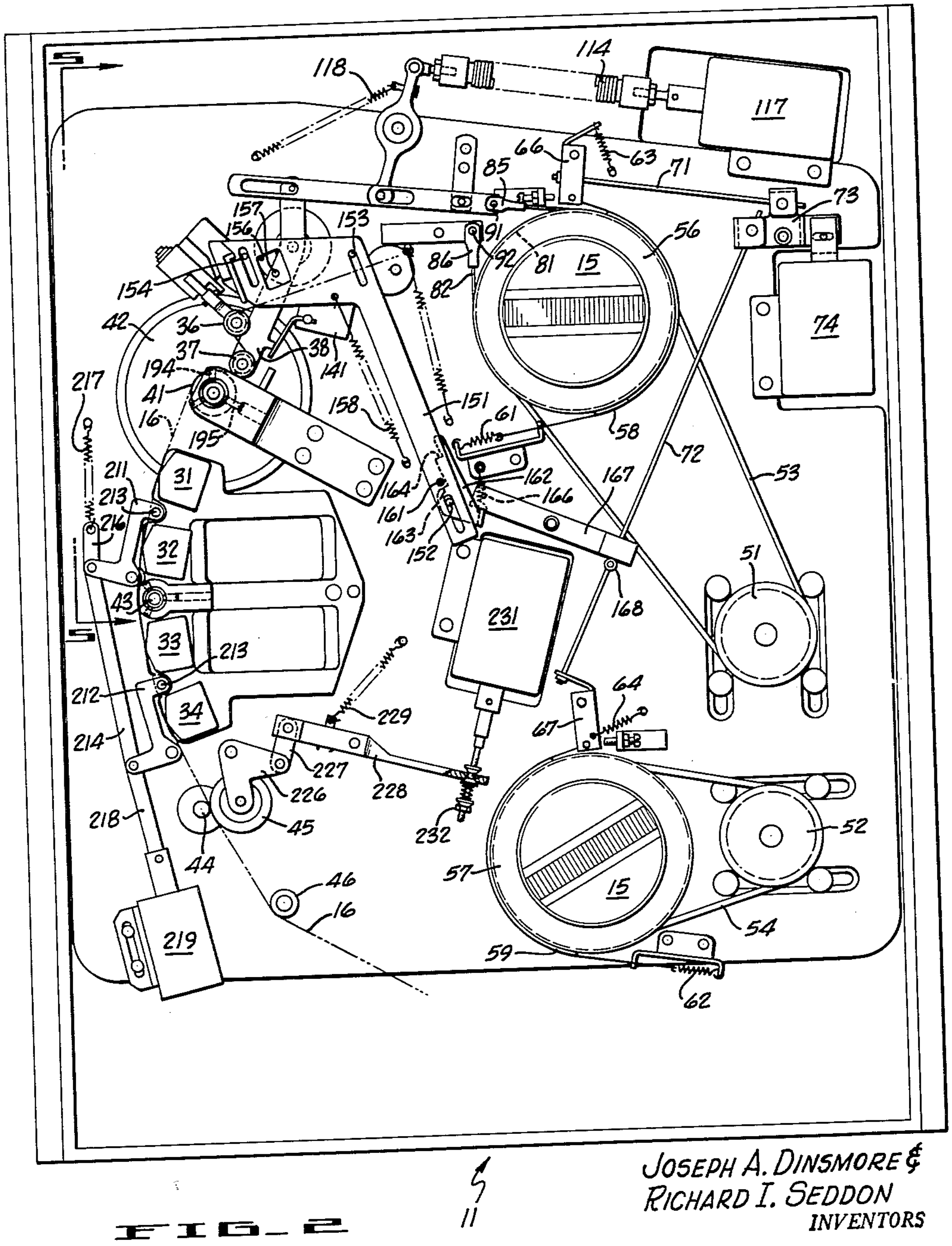
FIGURE 2 is a cross-sectional plan view of the apparatus shown in FIGURE 1, with the top plate and reels removed.

Referring now to FIGURE 2, the path of the tape 16 is shown extending from the vicinity of the supply reel, around a guide post 36, reversely around an idler 37 mounted at the end of a tape tension sensing arm 38, around an idler 41 that is provided with a massive flywheel 42, past the heads 31—32, over another idler 43, past the heads 33—34, between a drive capstan 44 and associated pinch roller 45, around a stationary guide post 46 and thence to the takeup reel. The reel spindles 15 are operated as well known in the art by a pair of motors 51 and 52 through drive belts 53 and 54, respectively, and each has associated therewith a brake drum 56 and 57, respectively, engaged by a brake band 58 and 59, respectively, for use, also as well known in the art, when the transport has been operating and is to be suddenly stopped. Each of the brake bands 58—59 is tensioned as by means of a relatively strong spring 61 and 62, respectively, and a relatively weaker spring 63—64, respectively, the latter operating through pivot arms 66 and 67, respectively, also as well known in the art. When the transport is not operating or is in the process of being stopped, both of the brakes 58 and 59 are engaged to stop the reels, with the tension of the stronger spring being more effective in stopping whichever reel is operating as a supply reel and the tension of the weaker spring being mainly effective in stopping whichever is operating as a takeup reel. When the transport is started in operation, both of the brake bands 58—59 are loosened as by operation of a pair of tension links 71 and 72 attached to the pivot arm 66—67 respectively and to a pivot arm 73, which in turn is actuated by the energizing of a solenoid 74.

As an important feature of the present invention, the brake drum 56 associated with the supply reel 14 is provided with an annular groove 81 of semi-circular cross-sectional form, in which is carried a brake band 82 constructed in a novel way to achieve unusually sensitive braking action in response to very slight changes in the braking forces applied thereto. It will be understood that the more closely this brake band 82 responds to very small differences of tape tension sensed by the idler 37 and arm 38, the more sensitively is the brake drum 56 and supply reel 14 braked or unbraked to alter the holdback torque of the supply reel and thus to counteract the changes in tape tension and effectively maintain the tape at an unchanging value of tension. A brake band of course must have a finite cross-sectional thickness, and brake bands that have been used in the past have always had sufficient thickness that they are resistant to bending moments, even when such bending moments are applied in such a way as to straighten out a band that is already bent. If the band is so to speak "at rest" in its bent position, then clearly any forces that are applied to straighten out the band so as to loosen it on the big brake drum will produce a delayed result only after the inherent stiffness of the band in its bent position is overcome. If on the other hand the band in its bent position is not "at rest" but is springily distorted so as to be able to react immediately to straighten out itself when released, then it follows that forces that are applied to increase the degree of the bend of the band and to tighten the band on the brake drum must first overcome the inherent stiffness or springiness of the band before braking can be produced. In either application, either in loosening or in tightening, a conventional brake band is found to be slow in reaction in one direction, and to be objectionably sensitive to at least one of the operations that are desired of it. The brake band 82 of the present invention however is constructed in such a way as to have substantially zero resistance to bending moments, either moments tending to increase or decrease the bend, and is therefore instantaneously and delicately responsive to the braking forces applied thereto. It is also constructed to have substantially zero longitudinal elasticity under the predetermined forces applied so as to avoid oscillating as a spring during the braking process, i.e., so as to be solidly responsive to the forces.

Figures 5, 6, 7:
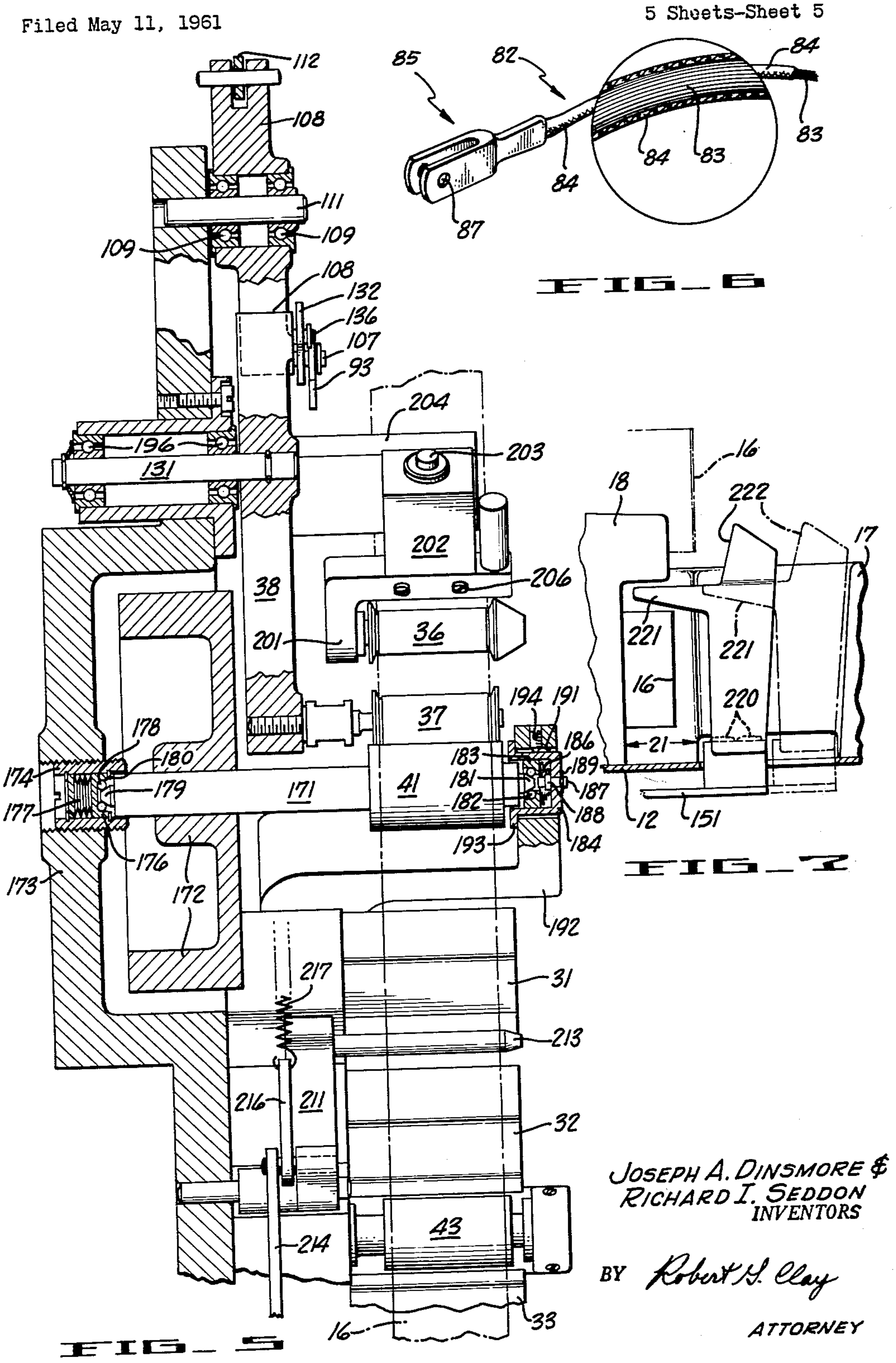
FIGURE 5 is an enlarged cross-sectional elevation view taken substantially on the plane of lines 5—5 of FIGURE 2.
FIGURE 6 is an enlarged broken-away fragmentary view of a portion of the apparatus shown in FIGURES 2–4.
FIGURE 7 is an elevation cross-section view to an enlarged scale taken substantially on the plane of lines 7—7 of FIGURE 1.

Referring particularly to FIGURE 6, the brake band 82 is shown as constructed of a plurality of fine strands 83 of wire, in this example approximately 126–130 in number, laid loosely side by side in a parallel arrangement and secured at their ends. The diameter of each strand is approximately .003 inch, and the strands are preferably made of plain copper so as to have minimum stiffness and springy resilience in combination with greatest possible tensile strength. The sheaf of strands is enclosed in a sheath 84 of frictional, wear-resistant material such as woven nylon cloth so as to have the most uniform possible frictional bearing effect on the brake drum 56. The ends of the strands 83, together with the ends of the nylon sheath 84 are enclosed in a pair of tubular end caps 85 and 86 and are secured therein as by being embedded in a liquid cement that is subsequently hardened. Each of the end caps 85—86 is flattened and is provided with a perforation 87 at the free end for coupling to the tensioning apparatus.

Figure 3:
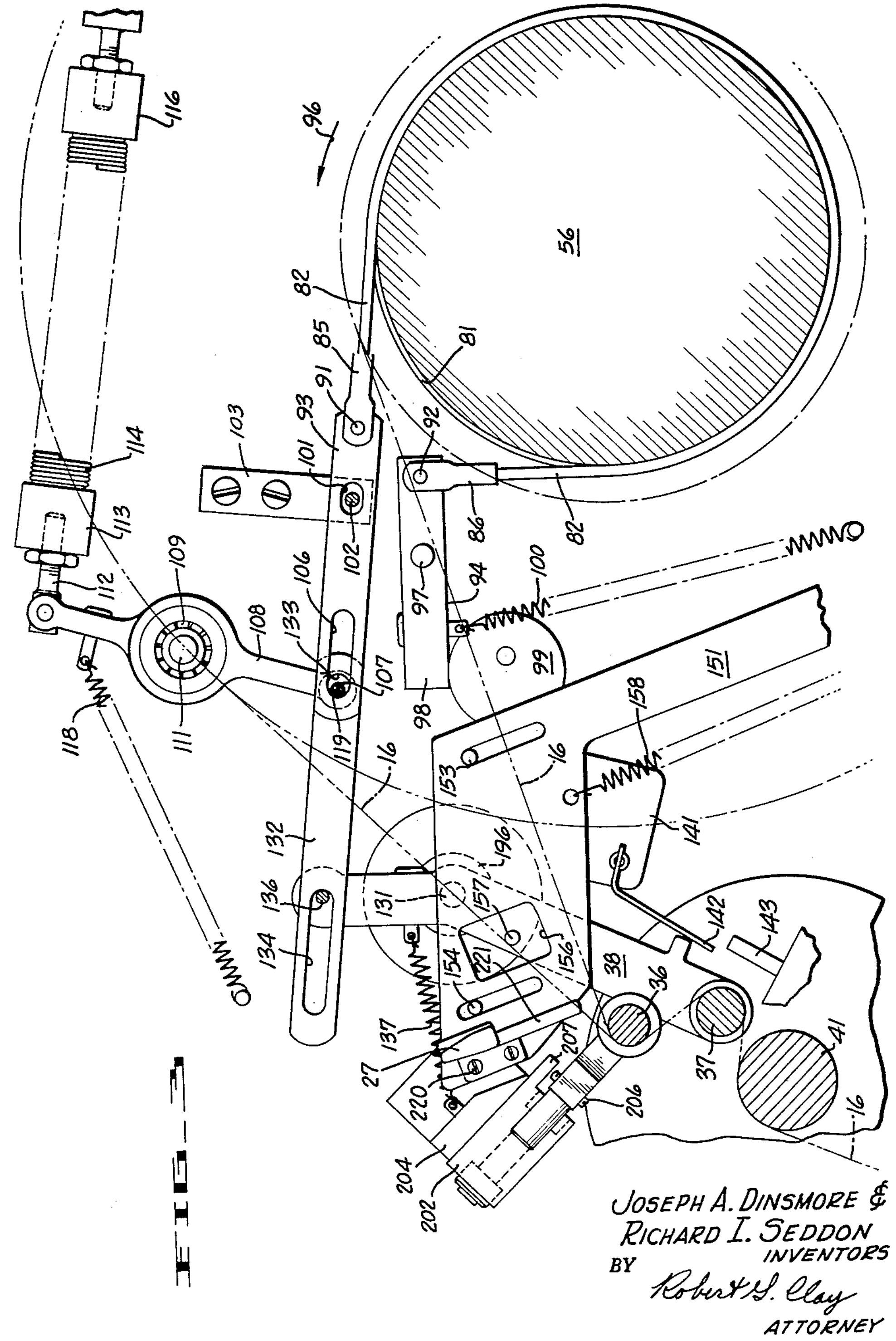
FIGURE 3 is an enlarged view of a portion of the apparatus shown in FIGURE 2.
Figure 4:
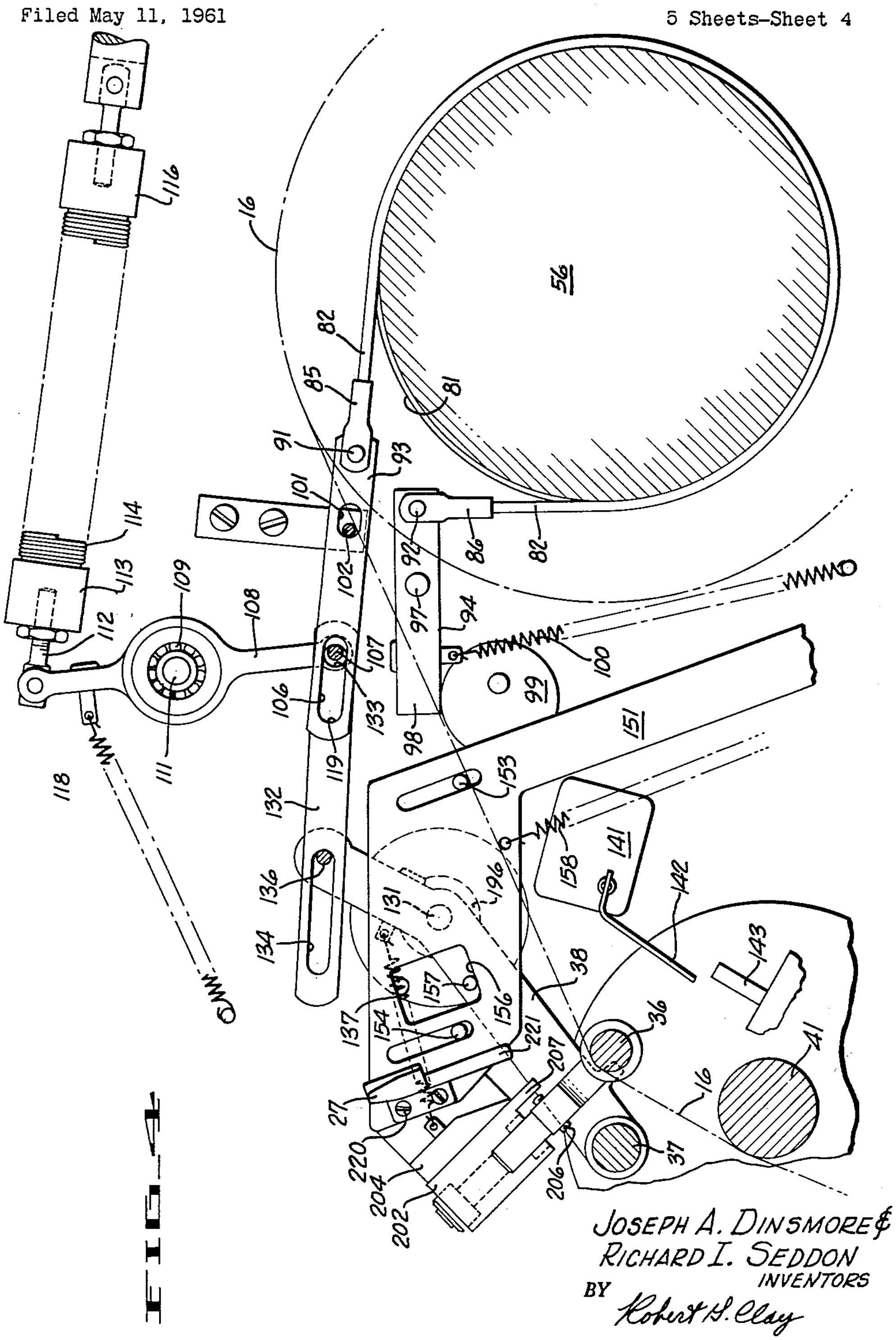
FIGURE 4 is a view similar to that of FIGURE 3, and showing the apparatus in a different position of operation.

When the brake band is assembled on the brake drum 56 as shown in FIGURES 2, 3 and 4, by means of rivets 91 and 92 attached to link arms 93 and 94, the band is at first "run in" under excessive tension until the outermost strands of wire have been somewhat ductilly elongated and until all of the strands are of correct length for receiving an equal portion of the operating tension when it is applied. Thereafter under normal loading of the band, the strands undergo no further elongation and all cooperate equally in sharing the tension and braking effect.

It will be seen that when the strands are in their operating position any increase or decrease in braking forces applied thereto will cause the strands to delicately increase their degree of curvature or decrease the same, and that if slight longitudinal bending of the band results, all of the strands are free for longitudinally shearing motion with respect to one another, and the resistance to bending of the sheaf of strands is considerably less than the resistance that would be put up by an integral band of cross section equal to the cross section of the sheaf.

Referring now to FIGURE 3 the manner in which the band 82 is tensioned is shown. With the brake drum 56 rotating in a counter-clockwise direction as illustrated by the arrow 96, the band 82 is wrapped counter-clockwise around the drum from one end cap 86, which is secured to the link member 94. During ordinary operation, this end of the band is relatively immovably fixed, but is manually adjustable to adjust the working position of the band. For purposes of adjustment, the arm 94 is pivoted on a pin 97 and the other end 98 of the arm is engaged against an eccentrically rotating cam 99, and is held against the cam as by means of a strong spring 100 fastened to the end 98 of the arm 94. Thus as the cam 99 is rotated, the exact position of the end 86 of the band is delicately adjusted. The other end 85 of the band is secured to the link member 93, which has an elongated slot 101 formed therein and engaging a pin 102 extending from a pin mount 103. The pin 102 limits the range of travel of the link member 93, so that even when the band is loosened to the greatest extent, it is retained in the groove 81 of the brake drum 56. The other end of the link member 93 has a further elongated slot 106 formed therein and engaging a pin 107 extending from a pivot arm 108, which is pivoted as by a ball bearing race 109 on a mounting shaft 111. The other end of the arm 108 is pivoted to a link member 112 extending from a spring mount 113, to which is affixed one end of a strong helical spring 114. The other end of the spring 114 is secured to a mount 116 and to a solenoid 117 (FIGURE 2) by means of which the spring 114 is tensioned when the machine is in operation. Energization of the solenoid 117 causes the arm 108 to be pivoted under tension of the spring 114, and the tension of the spring is transmitted through the pin 107 and the link member 93 to the brake band 82. A tension spring 118 is also secured to the arm 108 to ensure that the brake band is loosened when the solenoid 117 is de-energized.

As a second important feature of the invention, the bearing between the pin 107 and the end face 119 of the slot 106 is arranged to be an anti-friction bearing. It will be noted that the slot 106 has a width that is very much greater than the diameter of the pin 107 and that the face 119 is rounded on a radius of curvature that is very much greater than the radius of curvature of the pin 107. Thus as the arm 108 pivots, the pin 107 rotates with relation to the link member 93, but the pin does not slip on the face 119, and there is no friction to overcome in making the movement. Instead of slipping, the pin 107 rolls freely along the very gently curved surface of the face 119, and the pivoting motion is accomplished without internal resistance from the mechanism. The face 119 is machined to form with great accuracy and is provided with a high degree of finish so that there can be no wedging or stopping of the pin in rolling in such a way as to produce slippage. To preserve the contour in use, the link 93 is made of hardened material such as beryllium copper. It will be noted that the arm 108 is also pivoted by anti-friction bearings 109, and the pivot coupling between the arm 108 and the link member 112 is of the same construction as that between the pin 107 and the link member 93. It will be noted also that the length of the slot 106 permits full movement of the pin 107 when the solenoid 117 is de-energized and is made to accomplish its stroke of inactivation.

The tape tension sensing arm 38 is pivoted as by means of a pin 131 and an associated ball bearing 196 (FIGURE 5) and is connected to the brake band 82 in such a way as to be able to relieve the tension of the spring 114 whenever the tension in the tape 16 increases, and to permit additional tension to be applied to the band by the spring 114 whenever the tension in the tape 16 decreases. A second link member 132 connects the arm 38 and the pin 107 as by means of a rounded opening 133 engaging the pin 107 and a second elongated slot 134 engaging a pin 136 extending from an end of the arm 38. Both the opening 133 and the slot 134 are of greater widths than the diameters respectively of the pin 107 and the pin 136, and the engaging faces are similarly rounded so as to form anti-friction bearings as above described. A comparatively weak spring 137 is coupled to the arm 38 in such a way as to tend to rotate the arm in a counter-clockwise direction as shown in the figure. When the spring 114 is tensioned and the tape 16 is threaded as shown in FIGURE 3, the tension of the tape is sufficient to overcome the tension of spring 137 and the pin 136 is rotated to positively bear against the end of slot 134 that is in the direction of the brake band. Thus the link 132 is pushed toward the pin 107 and as the tension in the tape increases the arm 108 is urged in the direction in which the brake band 82 is loosened on the drum 56. The band does not move at all, or only infinitesimally, the important effect being that the pressure is increased on the pin 107 and the tension of the band is correspondingly delicately relieved, this effect being possible mainly through the construction of the band and the use of anti-friction bearing arrangements in all of the linkages involved.

It will be noted in FIGURE 3 that a microswitch 141 is provided with an actuating lever 142 positioned to be engaged by the tension arm 38 upon movement of the tension arm in a counter-clockwise direction past the operating position shown. This microswitch 141 is used for the purpose of stopping the operation of the transport whenever the tape is broken or in the event that the trailing edge of the tape comes off the supply reel at the end of a forward operation. As previously mentioned the spring 137 is chosen to maintain the tension arm 38 in the operating position as shown whenever the tape is threaded around the tension arm idler 37; and the braking force of the brake band 82 is so adjusted and maintained that the tension in the tape is always just the right amount to balance the spring 137 and to maintain the arm 38 in the illustrated operating position unless the tape is broken. A stop 143 is provided to limit the excursion of the arm 38 when the tape is broken so as not to damage the microswitch 141.

Referring particularly to FIGURES 1, 3 and 4, the positioning of the arm 38 and associated mechanism for both playing and threading of the tape is illustrated. For threading purposes, the arm 38 has a withdrawn position illustrated in FIGURE 4 and in phantom in FIGURE 1, wherein the idler 37 is on an opposite side of the threading channel 21 from the guides 36 and 41. Thus when the tape is initially threaded, it is simply inserted into the channels 21 and 22, and the takeup reel 13 is manually given a portion of a revolution in a counter-clockwise direction to ensure that the tape is taut between the reels, the brake bands 58 and 59 thereafter ensuring that the tape is maintained in this taut position. Then when the forward play button 24 is pushed, the arm 38 is actuated as by means explained below to swing in a counter-clockwise direction so that the idler 37 swings across the channel 21 and engages the tape and stretches it in the position shown in FIGURE 3 between the guides 36 and 41. The tautening of the tape in its initial threading position in channel 21 ensures that when the arm 38 is actuated, there will be sufficient tension in the tape to prevent the arm 38 from swinging all the way counter-clockwise to engage the microswitch arm 142, for it is not desired to actuate the microswitch 141 except at the end of an operation or when the tape is broken.

Now it is possible to explain a further function of the arm 94, cam 99 and spring 100 that secures the end 86 of the brake band 82. It will be seen that when the tape 16 is threaded and the machine is operating, the tension of the tape is effective to negate a large part of the tension of spring 114. When, however, the tape is broken, there is some delay in de-tensioning the spring 114, while the arm 38 swings to actuate the switch 141. During this interval, the full tension of spring 114 is applied to the brake band 82, and this tension is sufficient by itself and unrelieved to stop the brake drum 56 and supply reel almost instantaneously. The shock may cause damage to the reel and may exceed the elastic limit of the brake band so as to permanently elongate it, with the result that the operating position of the arm 38 would be changed. Accordingly, the strength of spring 100 is selected to permit give of the arm 94 and longitudinal movement of the brake band 82 under full strength application of the tension of spring 114, the band moving until link member 93 is stopped by engagement of pin 102 against the other end of slot 101. At this point the tension of spring 114 is totally relieved and the brake band is tensioned only by spring 100, which is of insufficient strength to cause immediate stoppage of the reel. An instant later the arm 38 succeeds in actuating microswitch 141 to energize the main stopping brakes 58 and 59, which are suited to bear the brunt of the reel stopping operation.

The operational control of the arm 38 and the associated apparatus is provided by means of an actuating slide 151 (FIGURES 2, 3 and 4). This slide 151 is carried on three pins 152, 153 and 154 mounted solidly on the transport and engaging parallel elongated slots formed in the slide. The slide 151 has a large opening 156 formed therein and a pin 157 projects from the arm 38 into the opening 156. When the arm is in its lowermost position as illustrated in FIGURES 2 and 3, the sides of the opening 156 are sufficiently far away from the pin 157 to permit free swinging of the arm 38 in all positions near its operating position as illustrated. A spring 158 is attached to the slide 151 to normally maintain the slide in this position. When, however, the slide is moved upward into its extreme opposite limit of motion as illustrated in FIGURE 4, a side of the opening 156 engages the pin 157 and swings the arm 38 to its retracted position with the post 37 on the opposite side of the threading channel 21. The movement of the slide to this threading position is effected manually whenever it is desired to thread or unthread the tape from the transport, and the manual movement of the slide is accomplished by means of the upwardly projecting element 27 previously described as a finger that in the operating position of the slide 151 extends across the channel 21 so as to prevent threading and unthreading and is only withdrawn from the panel in the threading position of the slide 151 and arm 38. Details of the construction of this finger 27 are explained below.

As will be readily understood, when the slide 151 is in its lowermost or operating position, it is held there by means of the spring 158; but when the slide 151 is moved to its uppermost limiting position as by manual operation of the finger 27, a detent arrangement is provided to hold the slide and arm 38 in this position. Referring particularly to FIGURE 2 there is shown a stud 161 projecting from the slide 151; and a detent element 162 is pivoted around the pin 152 and is provided with a pair of shoulders 163 and 164 engaging the pin 161 in the operating and threading positions respectively thereof. The element 162 is urged into pivoting relation engaging the pin 161 as by means of a spring 166; and it will be clear that whenever the slide 151 is manually moved upward to the threading position the shoulder 164 is brought into engagement with the stud 161 and the slide 151 is held in this position until the detent element 162 is again pivoted in a clockwise direction to release the stud 161. This pivoting motion to release the stud 161 is provided whenever the machine is started, as by energization of the solenoid 74 to disengage the brakes 58 and 59. Specifically, a pivot arm 167 is provided to engage with one end the detent element 162 and with the other end a stud 168 mounted on the brake actuating link 72 in such a manner that whenever the solenoid 74 is energized, and the link 72 is moved upward to disengage the brake band 59, the stud 168 urges pivoting of the arm 167 to trip the detent element 162 and release the slide 151, which in turn is urged by the spring 158 to return to its operating position, freeing the arm 38 to be urged by the spring 137 to its operating position.

The guide roller 41 is provided to cooperate with the tensioning mechanism above described in eliminating high-frequency vibrations and velocity changes in the tape crossing the transducing heads 31—34. The roller guide 41 is mounted between the tensioning mechanism as represented by the tension arm idler 37 and the nearest transducing head 31 so as to eliminate all of these vibrations. As best shown in FIGURE 5, the guide roller 41 is mounted on an axle 171 at the lower end of which is also mounted a massive flywheel 172. The roller 41, the axle 171 and flywheel 172 are freely rotatable and are operated as a unit by engagement of the tape 16 with the roller 41 during the forward play operation. As soon as the roller and flywheel are brought up to normal tape speed, they tend to continue rotating at this speed regardless of tiny tape velocity variations (vibrational in form); and because of the frictional engagement between the tape and the roller 41, the tape itself is constrained to continue moving at the fixed peripheral speed of the roller 41. The mounting of the axle 171 is as follows. In a portion 173 of the transport mounting, there is threaded an insert member 174 that contains a longitudinally sliding bearing race 176 supported on a Belleville spring 177. The bearing race 176 supports a number of ball bearings 178 which in turn support the conically tapered end 179 of the axle 171. Thus the bearing 178 is both an anti-friction rotational bearing and a thrust bearing for the axle 171, and the Belleville spring 177 provides a limited amount of cushioning for the vearing in the event the transport is dropped or otherwise subjected to shock. To complete projection of the bearing, a ring 180 is affixed to the inner wall of insert 174. The ring 180 limits the excursion of the shaft 171 and prevents it from cushioning the bearing and spring against the bottom of the insert 174. The axle 171 is provided at the upper end 181 with a conically tapered face engaged by thrust bearings 182 mounted in a race 183. The race 183 is free for a limited vertical sliding motion in a bearing mounting 184 and is spaced from the upper end of the bearing mount as by means of a conical coil spring 186. A stop stud 187 is mounted in the upper end of the bearing mount 184 and is secured as by means of an integral flange 188 and a snap ring 189 engaging opposite sides of the upper ends of the bearing mount. Thus in the event of sudden shock, the tapered end 181 of the axle 171 engages and is stopped by the stud 187 before the bearings 182 can be crushed against the upper end of the bearing mount. The bearing mount 184 itself is inserted loosely in an opening 191 formed in a bracket 192 that extends from the transport mounting. A lower flange 193 extending from the bearing mount 184 engages the lower side of the bracket 192, and a group of two set-screws 194 and one spring-loaded ball assembly 195 are equispaced around the sides of the bracket 192 to engage the sides of the bearing mount for adjusting the vertical alignment of the axle 171.

It is here noted that the intermediate guide roller 43 is mounted in a similar manner permitting adjustment of the vertical alignment of the roller, although there is no flywheel associated with this roller.

FIGURE 5 also shows how the arms 108 and 38 are mounted in ball bearing mounts 109 and 196; and how the guide post 36 is mounted to be axially self aligning with respect to the tape. The post 36 is mounted on a bracket 201 having an L shape and pivoted to a block 202, a counterweight 205 being provided at the upper end of the bracket 201 to balance the extending lower leg thereof. The bracket 201 is piovted to the block 202 as by means of a pin 203, and the block 202 is affixed to a mounting bracket 204 extending from the transport mounting. Thus the post 36 is balanced to be freely tiltable about an axis normal to its own axis and is actually self aligning when engaged by the tape 12. A pair of set screws 206 are provided in the bracket 201 on opposite sides of the tilting axis thereof and are extended to engage a lip 207 (FIGURE 4) extending from the block 202, so that the bracket 201 is limited in its pivoting motion.

As shown in FIGURES 2 and 5, a pair of tape lifting fingers 211 and 212 are provided to hold the tape away from the transducing heads 31—34 during fast forward or rewind operation of the machine. The fingers 211—212 each has a stud 213 extending upwardly therefrom and positioned in the inoperative position between the heads 31—32 and 33—34 respectively. The fingers 211—212 are connected by a link 214 and by a second link 216 to a spring 217 that holds the fingers in the inoperative position; and the fingers are also connected by means of a link 218 to a solenoid 219 so as to be pivoted when the solenoid is energized to swing the studs 213 against the tape and to pull the tape away from the transducing heads 31—34.

The operation of the slide finger 27 is best shown in FIGURES 3, 4 and 7. The finger is mounted on the slide 151 as by means of screws 220, and extends upwardly through the cover plate 12 to a position alongside the supply reel face of the island 17. In the retracted position of the arm 38 and slide 151 as shown in FIGURES 1, 4 and (in phantom) FIGURE 7, the finger has an extending portion 221 that does not project across the channel 21. An upper extension 222 serves as an engagement portion for the fingers of the operator of the machine so that the member can be withdrawn to this retracted position manually when desired. Upon the tripping of the detent member 162 when the machine is set in operation, the slide 151 is moved by the spring 158 to bring the extending portion 221 of the member 27 across the channel 21 and to block the subsequent removal or insertion of a tape. In FIGURE 7 the position of the tape 16 in the operating arrangement is illustrated and the position of the tape before insertion is shown in phantom.

Also shown in FIGURE 2 is the actuating mechanism for thepinch roller 35. The roller 45 is mounted on a pivot arm 226 to which is secured a link member 227, and a pivot arm 228 is in turn secured to the link member 227. A spring 229 urges the arm 228 to a position in which the pinch roller 45 is retracted from the capstan 44. A solenoid 231 is mounted on the transport mounting and has an operating extension 232 including lost motion means for connecting with the extending end of the pivot arm 228; and when the solenoid 231 is energized as shown in the figure, the pivot arm 228 is pivoted to engage the pinch roller 45 with the tape 16 and capstan 44.

The operation of the machine is as follows. Beginning from a position in which the tension arm 38 is retracted, the supply and takeup reels are placed on the spindle and the tape is extended between them and is inserted in the channels 21—22. The takeup reel 13 is manually rotated in a counter-clockwise direction until the tape is taut between the reels, the resistance of the engaged brake bands 58—59 serving to maintain the reels in this relation.

When all is in readiness, the forward play button 24 is pressed to energize associated electrical circuits and to actuate the following mechanisms. The takeup reel motor 52 is energized, and the solenoids 231, 117 and 74 are energized, to engage the pinch roller 45, to tension the brake band 82, and to disengage the brakes 58—59 respectively. The energization of the solenoid 74 causes the link 72 to move upwardly as shown in FIGURE 2 and causes the pivot arm 167 to trip the detent element 162, releasing slide 151 to be drawn by its spring 158 to the operative position. As the slide moves to operating position, the extension 221 of the finger 227 moves across the channel 21, and the opening 156 in the slide 151 also moves sufficiently far to permit the tension arm 38 to engage the tape under the influence of its spring 137 and also of the very much stronger spring 114, which was tensioned by energization of solenoid 117.

If the tape breaks or runs off the supply reel 14 at the end of a playing operation, the tension arm 38 is released to move further in a counter-clockwise direction and to actuate the microswitch 141. Actuation of the microswitch 141 causes the electrical circuits energizing the solenoids 231, 117 and 74 to be broken and the machine returns to inoperative position. The finger 27 however remains extended across the channel 21, and before the machine can be restarted, the operator must manually pull back the finger to move the slide to its retracted position.

During the operation of the machine, the brake band 82, because of its particular construction, responds instantly and delicately to all changes in tape tension that are sensed by the arm 38, to increase or decrease the braking forces and holdback torque on the supply reel and to maintain the tape tension at a constant value. The antifriction bearings in the linkages between the spring 114, the tension arm 38 and the brake band 82 ensure that the apparatus responds without hysteresis caused by friction. Any vibrations that emanate from the tension apparatus or the supply reel 14 are eliminated in passage over the rotating guide 41, which is constrained by its massive flywheel 42 to rotate at a constant velocity. The result of all of these features, working together, is that substantially uniform tape tension is maintained in the vicinity of the transducing heads 31—34.

What is claimed is:

1. In a tape transport of the class wherein a magnetic tape is pulled by a capstan from a supply reel and past a transducing head and wherein the tension in said tape is maintained by a tension sensing means engaging said tape between said reel and capstan and controlling a supply reel brake band tensioning means, the combination comprising: a brake band wrapped part way around a circumference of said supply reel and coupled to said brake band tensioning means, said brake band having substantially zero resistance to bending moments and substantially zero elongation under a predetermined maximum tension to be applied thereto; and anti-friction bearing means forming the operating coupling between said brake band and said tension sensing and brake band tensioning means.

2. In a tape transport of the class wherein a magnetic tape is pulled by a capstan from a supply reel and past a transducing head and wherein the tension in said tape is maintained by a tension sensing means engaging said tape between said reel and head and controlling a supply reel brake band tensioning means, the combination comprising: a brake band wrapped part way around a circumference of said supply reel and coupled to said brake band tensioning means, said brake band being provided with a plurality of fine strands arranged in parallel for relative longitudinal shearing motion therebetween so as to have substantially zero resistance to bending moments and substantially zero elongation under a predetermined maximum tension to be applied thereto; and at least one pivot-arm member and link member assembly forming the operating coupling between said brake band and said tension sensing and brake band tensioning means, the coupling between said members being provided by a rounded portion extending from one of said members and engaging a substantially tangential portion of the other member so as to produce rolling non-slip bearing contact therebetween.

3. In a tape transport of the class wherein a magnetic tape is pulled by a capstan from a supply reel and past a transducing head and wherein the tension in said tape is maintained by a tension sensing means engaging said tape between said reel and head and controlling a supply reel brake band tensioning means, the combination comprising: a brake band wrapped part way around a circumference of said supply reel and coupled to said brake band tensioning means, said brake band being provided with a plurality of fine strands arranged in parallel for relative longitudinal shearing motion therebetween so as to have substantially zero resistance to bending moments and substantially zero elongation under a predetermined maximum tension to be applied thereto; a link member coupled to said brake band in parallel with said brake band tensioning means and operable to relieve the tension in said band when pressure is applied to said member in a first longitudinal direction, said link member having an elongated slot formed therein and defining a rounded face convex toward said brake band; and an arm member pivotably mounted and terminating in a rounded pin loosely fitting within said slot and engaging said rounded face thereof, the radius of curvature of said pin being substantially less than the radius of curvature of said rounded face of said slot, said arm member being coupled to said tension sensing means for transmitting pressure to said link member through said rounded face of said slot and in said first direction whenever the tension in said tape tends to increase.

4. In a tape transport of the class wherein a magnetic tape is pulled by a capstan from a supply reel and past a transducing head and wherein the tension in said tape is maintained by a tension sensing means engaging said tape between said reel and head and controlling a supply reel brake band tensioning means, the combination comprising: a brake band wrapped part way around a circumference of said supply reel with the direction of rotation of said reel in contact with said band being from a first to a second end of said band, said brake band being provided with a plurality of fine strands arranged in parallel for relative longitudinal shearing motion therebetween so as to have substantially zero resistance to bending moments and substantially zero elongation under a predetermined maximum tension to be applied thereto; an anchoring member coupled to said first end of said brake band; a first link member coupled to the second end of said brake band, said first link member having a first elongated slot formed therein defining a first rounded face concave toward said band; a first arm member pivotably mounted and terminating in a first rounded pin loosely fitting in said first slot and engaging said first rounded face, said first pin having a radius of curvature substantially less than the radius of curvature of said first rounded face, said first arm member being coupled to said brake band tensioning means and being urged thereby in a pivoting direction to tension said first link member and said band against the pull of said anchoring member; a second link member provided with an opening defining a second rounded face concave toward said band and also engaging said first pin and of greater radius of curvature than said first pin, said second link member being aligned substantially in the same direction as said first link member and being operable to transmit pressure to said first pin and said first link and band in a first longitudinal direction toward said band and to thereby partly relieve the tension in said band, said second link member having a second elongated slot formed therein and defining a third rounded face convex toward said band; and a second arm member pivotably mounted and terminating in a second rounded pin loosely fitting within said second slot and engaging said third face thereof, the radius of curvature of said second pin being substantially less than the radius of curvature of said third face, said second arm being coupled to said tension sensing means for transmitting pressure to said second link member and said first pin in said first direction whenever the tension in said tape tends to increase.

5. The combination described in claim 4 and also including a pair of spaced guide members, one of which is a roller guide, engaging said tape between said capstan and said reel; and wherein said tension sensing means includes a member mounted on said second arm and engaging said tape between said guide member and said roller guide so as to cause said second arm to receive a component of the tension in said tape and to transmit pressure to said second link in said first direction as a direct function of said tape tension.

6. The combination described in claim 4, wherein said band tensioning means includes a helical spring coupled to said first arm and urging said first arm to pivot in a direction to tension said band; a solenoid also coupled to said spring for tensioning said spring when said solenoid is energized and for fully relieving said tension when said solenoid is in a de-energized condition, said first arm also being spring loaded to pivot in a tension relieving direction when said solenoid is de-energized, whereby said first pin slides the length of said first slot and said second pin slides the lengths of said second slot; and stop means coupled to said first link to prevent undue loosening of said band on said reel in the un-tensioned position thereof.

7. The combination described in claim 6 and also including lost-motion means coupled to said second arm and manually controllable for pivoting said arm to a retracted position of said tension sensing member during threading of said tape, said lost-motion means also having an operative position permitting free pivoting movement of said second arm to an end-of-tape position thereof, said arm being spring-loaded to move toward said end-of-tape position when free of said tape and said lost-motion means; and means engageable by said arm in said end-of-tape position for stopping the operation of said transport.

8. The combination described in claim 7 wherein said anchoring member comprises a third arm pivotably mounted and coupled at one end to the first end of said brake band; an eccentrically rotating circular member mounted to peripherally engage said third arm and to pivot said arm in rotation to adjustably vary the tension loading range of said brake band; spring means coupled to said third arm and urging said third arm into constant engagement with said eccentrically rotating member even when said brake band is loaded to said predetermined maximum tension; and means cooperating with said stop means for limiting the movement of said first link member when said first link member is moved by forces acting on said brake band in excess of said predetermined maximum tension.

9. As a subcombination, a brake band comprising: a plurality of fine strands arranged in parallel for relative longitudinal shearing movement therebetweeen, said strands being coupled at their respective ends so as to have substantially zero resistance to bending moments and substantially zero elongation under the application of predetermined tensile forces.

10. The subcombination of claim 9, wherein said brake band is provided with a pair of tubular terminal members encasing the individual ends of said strands; and a quantity of adhesive material impregnating said band between said strands and within said terminal members, so as to bond said strand ends to one another and to said terminal members.

11. As a subcombination, a brake band comprising: a plurality of fine strands arranged in parallel for relative longitudinal shearing movement therebetween so as to have substantially zero resistance to bending moments and substantially zero elongation under the application of predetermined tensile forces, said strands being encased in a sheathing of frictional material that also has substantially zero resistance to bending moments, and said strands and sheathing material being coupled at their respective ends.

12. As a subcombination, a brake band comprising: a plurality of fine copper strands laid loosely in parallel and individually secured at their ends, said strands being encased in a sheathing of frictional plastic material so as to have substantially zero resistance to bending moments and substantially zero elongation under the application of predetermined tensile forces; said brake band also being provided with a pair of tubular terminal members encasing the individual ends of said strands and of said sheathing material; and a quantity of adhesive material impregating said band within said terminal members so as to bond said strand ends to one another and to said sheathing material and to said terminal members.

13. As a subcombination, a pair of link members coupled for anti-friction operation, both of said members being mounted for pivoting motion and at least one of said members being mounted for translation in a predetermined direction, the coupling between said members being provided by a rounded portion extending from one of said members and engaging a substantially tangential portion of the other member so as to produce rolling non-slip contact therebetween.

References Cited in the file of this patent

UNITED STATES PATENTS

| | | |
|---|---|---|
| 2,569,850 | Falconer | Oct. 2, 1951 |
| 2,734,387 | Jansen | Feb. 14, 1956 |
| 2,750,152 | Schinske | June 12, 1956 |
| 2,804,945 | Thierman | Sept. 3, 1957 |
| 2,875,858 | Dunham | Mar. 3, 1959 |
| 2,911,162 | Kyle | Nov. 3, 1959 |

FOREIGN PATENTS

| | | |
|---|---|---|
| 471,299 | Italy | May 12, 1952 |